Oct. 29, 1968 R. D. GIBBS 3,407,470
APPARATUS FOR EFFECTING COIL-PLACING OPERATIONS IN INDUCTIVE
DEVICES AND METHOD OF MANUFACTURING SAME
Filed July 28, 1966 2 Sheets-Sheet 1
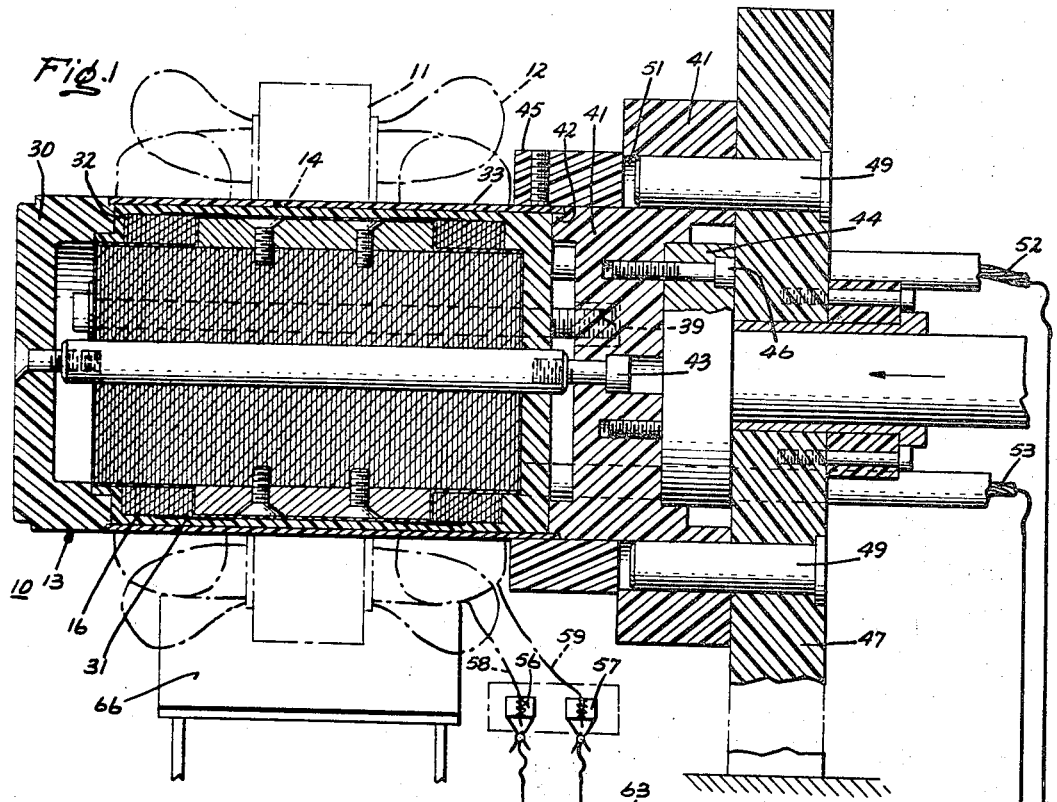
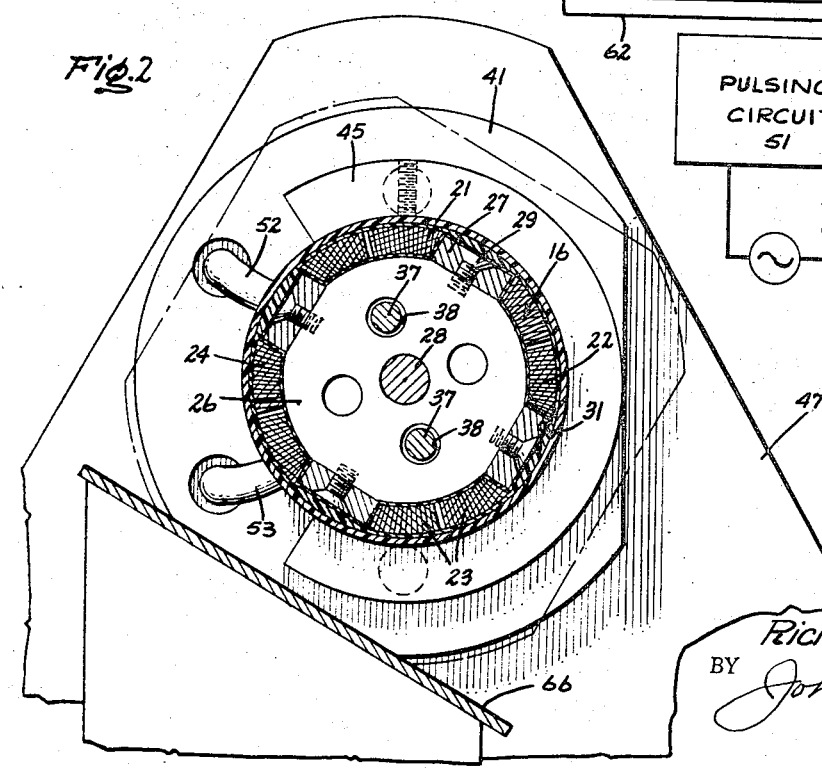
INVENTOR.
Richard D. Gibbs,
BY John M. Stoudt
Attorney.

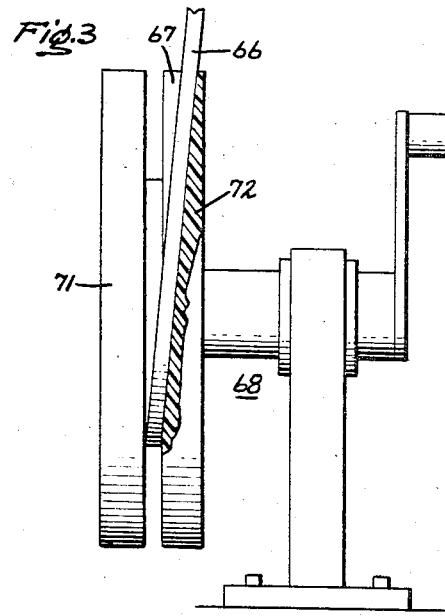
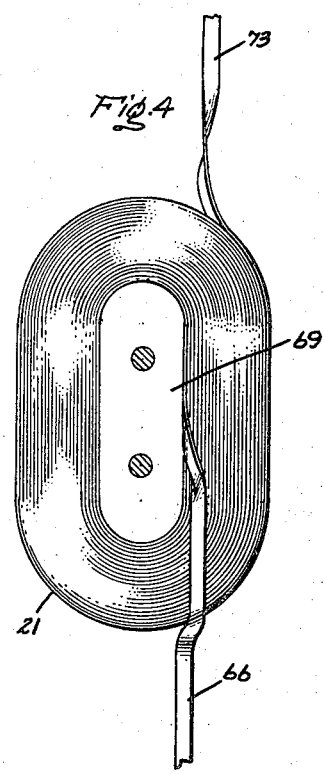
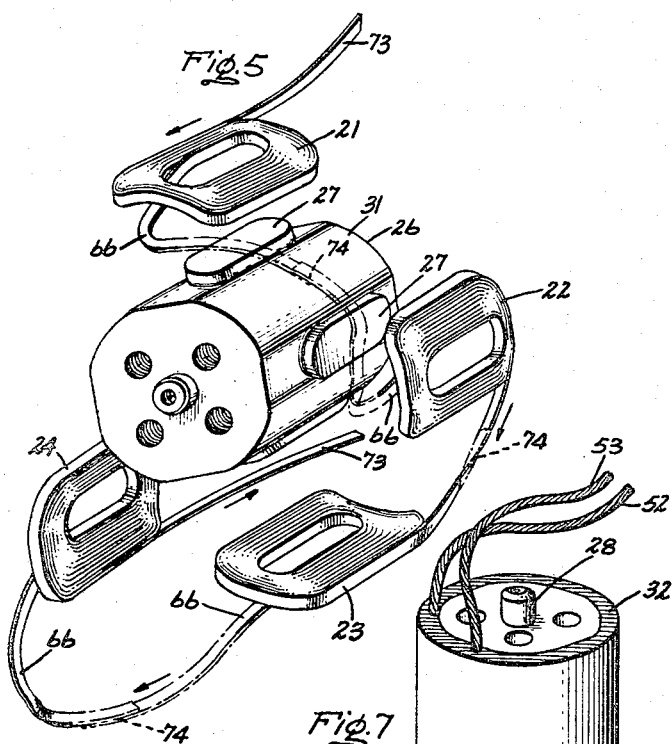
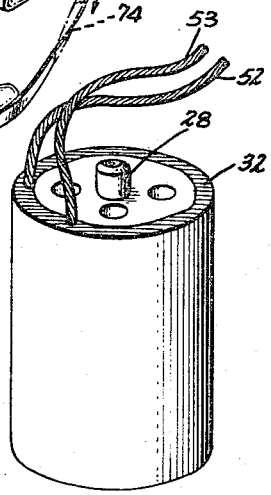
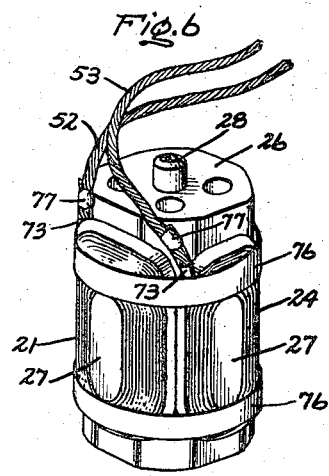

United States Patent Office 3,407,470
Patented Oct. 29, 1968

3,407,470
APPARATUS FOR EFFECTING COIL-PLACING OPERATIONS IN INDUCTIVE DEVICES AND METHOD OF MANUFACTURING SAME
Richard D. Gibbs, Malta, Ill., assignor to General Electric Company, a corporation of New York
Filed July 28, 1966, Ser. No. 568,587
7 Claims. (Cl. 29—205)

Background of the invention

This invention relates to improved electrical inductive apparatus for effecting coil-placing operations in inductive devices and a method of manufacturing the same, and in particular to such apparatus, and a method for its fabrication, especially suitable for employment in the manufacture of electrical coils carried by magnetic cores adapted for use in small and fractional horsepower size dynamoelectric machines.

In the mass production manufacture of small and fractional horsepower dynamoelectric machines, it is common practice in one approach to insert coils formed of a number of wire turns into slots of a coil accommodating structure, such as a stator core, and then to press back at least the end turn portions of the coils, which are exposed axially beyond the confines of the slots, toward the end faces of the core. Relatively recent innovations accomplish the desired end turn placement as well as placement of side turn portions carried in the slots of the core by the utilization of electrical energy rather than by the use of mechanical equipment which made physical contact with the outer surfaces of the coil portions. In one application, such as that disclosed in the pending U.S. patent application of Clovis E. Linkous, Ser. No. 414,825, filed Nov. 30, 1964 now Patent No. 3,333,330 granted Aug. 1, 1967, one or more high energy rate surges are injected into electrical conductors of an apparatus, which with specific reference to stators is held stationary in the bore of the stator, to inductively couple the conductors to the stator coil as the coil is being placed into the desired position relative to the core.

During this placement operation, it has been found in actual practice that for some applications the surges in the apparatus may subject it to unusually high torsional forces which tend to shorten its operating life considerably. In studying this problem I have determined that the electrical conductors of the apparatus along with the coils to be placed in the inductive device may produce unusually large unbalanced torsional forces as the surges are being injected into at least the conductors of the apparatus.

It is therefore desirable, if not essential, that the apparatus be constructed to effectively reduce unbalance in the torsional forces during normal operating conditions and to withstand or absorb the remaining forces without adversely affecting its longevity. It is further desirable that the longevity achieved by the apparatus be somewhat commensurate with the operating life of the equipment with which it is used, such as the components of the surge supply or pulsing circuits which produce the high energy rate surges so that the system is substantially maintenance free. Moreover, the apparatus should be capable of efficient and economical operation in the mass production manufacture of inductive devices, and with specific reference to stators, should produce the desired coil placement results with the minimum input of energy being required for a given application. Then, too, a method of fabricating the apparatus should be provided which is also inexpensive and highly practical yet produces the apparatus having the desired features already mentioned.

Summary of the invention

Accordingly, it is a primary object of the present invention to provide improved electrical inductive apparatus for effecting coil-placing operation in inductive devices and the method of manufacturing the same.

It is another and more specific object to provide improved yet economically constructed electrical inductive apparatus for effecting the desired placement of electrical coils in magnetic cores which effectively reduces unbalance in torsional forces under normal operating conditions and can withstand torque pulsations applied to it for long periods of operation.

It is a further object of the present invention to provide improved electrical inductive apparatus and the method of its manufacture which incorporate the desirable features mentioned above.

In accordance with the preferred embodiment of the present invention, I provide improved electrical inductive apparatus for effecting coil-placing operations in an inductive device. In one form the apparatus includes a fixture having a winding formed of at least one generally oblong shaped group of non-circular conductor turns having major and minor cross-section dimensions wound in a single layer, with the major dimensioned walls being in face to face engagement. The terminals of the winding are adapted for connection to a surge source of electrical energy for supplying one or more surges to the winding which in turn generates a surge in the coils to be placed.

A rigid body carries the winding and has a raised section encircled by the turns, with curved wall portions facing the innermost turns. To prevent stresses from being created in the turns, the radius of generation for the curved wall section should exceed 0.4 inch. The turns are supported underneath by another section of the body which engages the minor dimensioned turn walls, with the winding and adjacent body being encapsulated in hardened material. A sleeve of tough insulating material is fitted over and surrounds the winding and raised section, and a detachable end cap is removably mounted to one end of the body to permit replacement of the sleeve, should that be necessary.

The other end of the body is coupled to a driver member through an electrical isolation plate for imparting linear motion to the winding and rigid body in order to transport the core having coils to the proper location, and for selectively preventing movement of the fixture as the surge is being injected into the winding.

This economical construction of the electrical inductive apparatus is capable of withstanding unusually high torsional forces created during the coil-placing operation, and has a potential life expectancy commensurate with other components of the equipment, such as the pulsing circuit. In addition the apparatus is readily adaptable to efficient mass production utilization, and is easily manufactured, which forms a further aspect of this invention.

The turns are initially wound into the desired form on a suitable mandrel and thereafter mounted in position on the rigid body. The body and winding, except for the terminations, are then encased in unhardened material which is subsequently hardened, the sleeve assembled in place, and the detachable end cap finally removably secured to the body.

The subject matter which I regard as my invention is particularly pointed out and distinctly claimed in the concluding portion of the specification. The invention itself, however, together with further objects and advantages thereof, may be best understood by reference to the following description taken in conjunction with the accompanying drawings.

Brief description of the drawings

FIGURE 1 is a view, partly in section and partly broken away, of an improved electrical inductive apparatus incorporating the preferred form of the present invention, the apparatus being adapted for inductive coupling to an inductive device, such as a dynamoelectric machine stator shown in phantom;

FIGURE 2 is a cross-sectional view taken along line 2—2 in FIGURE 1 to show details of the apparatus;

FIGURES 3 through 7 inclusive illustrate the preferred method of manufacturing the primary winding fixture of the apparatus wherein FIGURES 3 and 4 show the formation of one or more groups of turns;

FIGURE 5 is a view in perspective of several groups of turns preparatory to their installation on to the fixture body;

FIGURE 6 is a view in perspective of the turn groups temporarily held in place on the fixed body before the turns and body have been surrounded with hardenable material; and FIGURE 7 is a view in perspective of the primary winding fixture prior to its assembly with the remaining components of the apparatus shown in FIGURES 1 and 2.

*Description of the preferred embodiment*

Having more specific reference now to the drawings, I have illustrated therein an improved electrically inductive apparatus 10 embodying the preferred form of my invention for effecting coil-placing operations in inductive devices, such as the stator 11 shown in phantom in FIGURES 1 and 2. The stator includes the usual ferromagnetic core which carries a plurality of coils 12 forming an excitation winding, the stator being adapted for use in a fractional horsepower electric motor (not shown). In the exemplification, for purpose of disclosure, it will be assumed that coils 12 are arranged in the slots of the core to provide four equally spaced apart magnetic poles.

A primary winding fixture 13 is disposed in the central bore 14 of the stator and carries a primary winding, generally indicated at 16, which simulates the magnetic poles of stator winding 12 for inductively coupling therewith. Since the stator of the exemplification has four equally spaced poles, winding 16 includes a similar number of conductor groups 21, 22, 23, and 24 best seen in FIGURE 5. Each group is wound from a number of turns of insulated conductor material having major and minor cross-section dimensions, the cross-section of an individual turn being of rectangular configuration. The turns in a given group are wound into a single layer, with the walls having the major dimension being in face to face engagement to provide a group generally oval or oblong in shape having straight sides and curved ends best seen in FIGURES 4 and 5.

The groups are carried by a rigid body member having a central section 26 supporting the minor dimensional walls of the turns beneath the groups and a raised section 27 generally complementary in contour to the innermost turn in the group which faces the section. It has been found in actual practice that creation of unbalances and high stresses in the turns under operating conditions, their curvature at the ends and thus that for section 27 should be gradual, rather than sharp, for example, a radius of generation exceeding 0.4 inch. In the illustrated form, section 26 is fabricated from a stack of magnetic laminations which are held together on a shaft 28 by an interference fit. The outer periphery of section 26 has four flat surfaces extending the axial length of the stack and mount, as by screw 29, solid metal blocks which define sections 27. Although any suitable material may be employed as the rigid body, provided it has sufficient strength, when metal is used a relatively thin coating 31 of insulation should insulate the turns from the rigid body; e.g., epoxy resin approximately ten mils thick which will not detract from the firm support afforded winding 16 by sections 26, 27.

The winding and body are encapsulated in a tough, relatively hard material 32 of a type preferably also having the characteristic of slight flexibility to permit a small degree of relative movement of the individual turns under operating conditions. This in turn allows material 32 to absorb some of the torque pulsations created as placement of the coils in stator 11 are being effected. A sleeve 33 of suitably tough insulating material, like epoxy resin or "Textolite" (registered trademark of the General Electric Company), surrounds the circumference of the rigid body and extends axially beyond the encapsulant. This sleeve has a circumferential shape complementary to the bore of the stator core and, along with the fixture body, supports the stator. A detachable end cap 30, having a central cavity enclosing the free end of the body, is removably secured to the body by screw 35 entering shaft 28 to permit replacement of sleeve 33 should the need ever arise. Thus, in the event that mass production usage ultimately produces wear on the sleeve, it can easily be replaced by removal of cap 30 without necessitating a reconditioning of the entire fixture.

In order to mount the fixture for linear motion for picking up the core at another location and transferring it to the position shown in FIGURES 1 and 2, one end of the fixture is coupled to a driver member 36 in the form of a piston rod. More specifically, at least two bolts 37 project entirely through axially aligned holes 38 in the central section 26, the holes serving as the means for aligning the laminations during their assembly onto shaft 28. These bolts are threadingly received in metal inserts 39 mounted in electrical isolation plate 41 made of insulating material like "Textolite" while functions to isolate section 27 and the bolts from driver member 36. A flanged end 42 of plate 41 which faces the fixture has an annular recess for receiving part of sleeve 33. A central screw 43, leaving its head recessed from enlarged end 44 of member 36 and the other end received in the shaft, assists in securing section 26 firmly to the plate. A number of angularly spaced apart screws 46 attach plate 41 to enlarged end 44.

Consequently, member 36, plate 41, and the fixture are capable of moving together as an integral unit between an extended position (to the left in FIGURE 1), where the stator may be slid onto the sleeve 33 as facilitated by cap 30, and the illustrated retracted position where the coil-placing operation is effected. Any suitable means may be used to locate the core in the desired axial position on the fixture in the retracted position, as by a semi-circular element 45 secured to the fixture next to plate 41. As the core having coils is slid onto the fixture, the coil end turns will come into contact with the element and further axial movement will thus be prevented.

For supporting the unit is an upright stationary wall 47, preferably constructed of solid insulation which forms part of an enclosure in the manner disclosed in my copending application Ser. No. 568,593, filed the same day as the present one, and a bearing post (not shown) spaced to the right of wall 47. Member 36 projects through the wall and is slidably journaled near fixture 13 by sleeve bearing 48. Wall 47 also mounts a pair of guide pins 49 which enter aligned holes 51 in plate 41 to guide the unit into the retracted position. In addition, during the coil-placing operation, the manner in which fixture 13 is attached to member 36 as already explained and the guide pins cooperate to prevent rotation of the fixture in response to the forces being exerted upon it.

To effect the desired coil-placing operation, as the core and coils are being carried on the primary winding fixture, the type of pulsing circuit 51 or energy surge source disclosed in the copending application Ser. No. 568,585 of William E. Baldwin may advantageously be utilized. However, the Baldwin circuit is shown merely by way of example and any circuit capable of supplying the requisite surges may be used. Insulated terminal leads 52, 53, electrically joined to the ends of winding 16, project through suitable apertures in the fixture and related components, including wall 47, and are connected across terminals 54, 55 of the pulsing circuit 52. A pair of electrical connectors 56, 57 having serrations for cutting through the insulation and into coil terminations 58, 59 electrically join the coils 12 to pulsing circuit terminals 54, 61 through conductors 62, 63.

By closing switch 64, storage capacitors are charged to a first voltage level and subsequently discharged into primary winding 16 as the circuit provides a closed electrical path through the coils of the stator. The surge of current flow through winding 16 induces current flow in the stator coils and produces a transient magnetic field. The current flow and varying field create electromagnetic forces which act on the coils to force them back. During this interaction, the primary winding 16 is rigidly held in the retracted position. In actual practice, for a capacitor bank nominally rated at 630 microfarads (610 microfarads actual) charged to a voltage level of 1,800 volts, a pulse of 1,020 joules about six microseconds in duration with 8,000 peak amperes was injected into winding 16. A platform 66 is used to align radially the stator poles with the magnetic poles of the primary winding 16 and concurrently impedes angular movement of the stator relative to the fixture.

Thereafter, the pulsing circuit sequentially supplies a second level of energy to the stator coils while simultaneously short circuits winding 16 to produce an interaction which forces the coils to the press-back position depicted in FIGURE 1. One pulse used was 800 joules (1,600 volts) which lasted for approximately 5 milliseconds with a peak of 500 amperes. Even after repeated pulse applications extending over long periods of time in this order of magnitude and higher to the electrical inductive apparatus constructed in accordance with the preferred embodiment the apparatus did not fail.

It will be appreciated from the foregoing that the apparatus, in spite of its economical construction, is capable of withstanding unusually high torsional forces created during the coil-placing operation and has a potential life expectancy commensurate with other components, such as the pulsing circuit. Moreover, the apparatus is readily adaptable for efficient and rapid use in the mass production manufacture of inductive devices and is simple to manufacture.

In this latter regard, attention is particularly directed to FIGURES 3–7 inclusive which reveal the preferred manner in which the primary winding fixture 13 may be fabricated. Each group of turns is wound with the desired number of turns, such as seventeen turns of 0.035 inch x 0.175 inch copper insulated wire in one application, by initially inserting an end 66 of non-circular wire into a slot 67 of winding form 68 and edgewise winding the chosen number of turns tightly around arbor 69, between plates 71, 72. The size and shape of the arbor is substantially the same as body section 27 so that there are no sharp bends in the turns to create stresses, especially at the two end portions of the oblong-shaped group. Plate 71 is disassembled from the winding form and the wound turn group removed. Turn ends 66, 73 are then twisted as seen in FIGURE 4, with end 66 being flattened against the turns. In addition, the cross-section configuration is then compressed to match the contour of body section 26.

After four groups have been wound, preselected ends are electrically joined together, as by soldered joints shown in FIGURE 5 to provide interpole connections and opposite instantaneous polarity for adjacent groups when they have been arranged on the rigid body. Note the assumed current flow through the groups indicated in FIGURE 5. High temperature adhesive tape 76 is wrapped around the groups after their assembly around body sections 27 and insulation; e.g., woven glass filament, has been inserted between polar groups. Leads 52, 53 are electrically joined at 77 to exposed ends 73 of turn groups 21 and 24, as shown in FIGURE 6.

Material 32 in an unhardened state is finally applied over the turn groups in a conventional mold (not shown) and subsequently cured or hardened to encapsulate the body and winding as illustrated in FIGURES 1 and 7. One satisfactory material having the necessary fluid quality in the unhardened state and the tough, slightly flexible characteristics when hardened is Epoxylite 293–11, commercially available from the Epoxilite Corporation. This material when unhardened is sufficiently fluid to enter the spaced and interstices of the turns, if any, to produce an encapsulated body substantially free of voids. It is desirable from the standpoint of force level obtainable for a given size to furnish the upper edge as close to the outer surface of the fixture as is possible. In view of this and the construction of winding 16, the fixture has an unusual ability to dissipate heat during the coil-placing operation, further enhancing the quality of the fixture.

Finally, electrical isolation plate 41 is attached to one end of the rigid body, sleeve 33 slipped over the other end, end cap secured in place and the assembled unit fixedly attached to driver 36 when in the extended position away from upright wall 47 to complete the assembly.

Consequently, while I have shown and described the preferred embodiment and certain features of my invention it will be obvious to those skilled in the art that changes and modifications may be made without departing from the invention. It is, therefore, intended in the appended claims to cover all equivalent variations as fall within the true spirit and scope of my invention.

What I claim as new and desire to secure by Letters Patent of the United States is:

1. An electrical inductive apparatus for effecting coil-placing operations in inductive devices comprising an inductive fixture having winding means for connection in circuit with a source of electrical energy capable of producing a surge of preselected magnitude; and body means for retaining the winding means in a fixed position adjacent coils in an inductive device as the surge is being injected into said winding means to cause electromagnetic forces to be exerted on the coils for effecting placement thereof relative to the device; and means coupled to the body means for selectively imparting linear motion to the body means and winding means and for preventing movement thereof as the surge is being injected into said winding means.

2. The apparatus set forth in claim 1 in which the inductive fixture includes a sleeve formed of insulating material surrounding the body means and winding means for electrically isolating the winding means from the inductive device, and detachable means removably secured to said body means to allow replacement of said sleeve from time to time as needed.

3. The apparatus set forth in claim 1 in which the winding means comprises at least one group of turns formed of conductor material having major and minor cross-section dimensions, with the major dimension extending toward the inductive device; and said body means has a raised section received within the confines of the turns with a curved wall portion facing the innermost turn, the curvature of said curved wall portion having a radius of generation exceeding 0.4 inch.

4. An electrical inductive apparatus for effecting coil-placing operations in inductive devices comprising at least one generally oval-shaped group of turns wound from non-circular conductor material having major and minor cross-section dimensions; rigid body means including a raised section projecting into the center of the group of turns and having a wall facing the innermost turn, and a section disposed beneath said turns for support thereof, said wall including a pair of opposed, curved end portions for minimizing stresses on the group of turns; means retaining said turns on said sections; and means for connecting said turns to an electrical energy surge source for producing a surge of energy in the turns to cause an interaction with coils of the inductive device to effect the desired placing operations.

5. The apparatus set forth in claim 4 in which the fixture has a cross-section generally complementary with a bore of a stator core for fitting into the bore, an insulating sleeve encircling the body means, and detachable means retaining the sleeve in position on the body means to permit replacement thereof.

6. The method of manufacturing an inductive fixture of electrical inductive apparatus for effecting coil-placing operations in inductive devices comprising the steps of winding a plurality of turns from non-circular conductor material having major and minor configurations; mounting the wound turns on a rigid body having a first section projecting centrally of the turns and a second section disposed beneath the minor cross-section dimensions of the turns for support thereof, with the first section having a pair of curved wall portions facing the major cross-section dimension of the innermost turns; and encasing the turns and rigid body in hardened material for retaining the relative positions of the turns and body sections, with terminal ends of the turns projecting beyond the hardened material.

7. The method set forth in claim 6 in which the sleeve of insulating material is slid over the outer surface of the hardened material and a detachable end cap is removably mounted at one end of the rigid body to permit the removal of the sleeve should the need arise.

References Cited

UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—606 |
| 3,348,183 | 10/1967 | Hodges et al. | |
| 3,353,251 | 11/1967 | Linkous | 29—205 |

JOHN F. CAMPBELL, *Primary Examiner.*

J. CLINE, *Assistant Examiner.*